Feb. 23, 1965     H. K. GOEBEL     3,171,040
FAST CHARGING CIRCUIT FOR PULSE NETWORKS
Filed Jan. 16, 1961     2 Sheets-Sheet 1

INVENTOR.
HELMUT K. GOEBEL
BY
ATTORNEY

Feb. 23, 1965     H. K. GOEBEL     3,171,040
FAST CHARGING CIRCUIT FOR PULSE NETWORKS
Filed Jan. 16, 1961     2 Sheets-Sheet 2

United States Patent Office 3,171,040
Patented Feb. 23, 1965

3,171,040
FAST CHARGING CIRCUIT FOR PULSE NETWORKS
Helmut K. Goebel, Rochester, N.Y., assignor to General Dynamics Corporation, Rochester, N.Y., a corporation of Delaware
Filed Jan. 16, 1961, Ser. No. 82,931
4 Claims. (Cl. 307—88.5)

This invention relates to pulse generating systems and is particularly directed to means for generating pulses of considerable power, yet of precisely controlled microsecond duration, of very close spacings, of constant amplitude, and of low duty cycle. The pulses generated in the system of this invention are of the type which could be employed to modulate a radar transmitter.

The usual technique in modulating the magnetron of a radar transmitter comprises a sizeable capacity storage means charged from a direct current source. The stored energy is then suddenly discharged through a load circuit including the anode-cathode circuit of the magnetron through a switch, such as a gaseous discharged thyratron. It has been found, unfortunately, that for some applications the recharging time of the storage capacity is entirely too long. This results in an undesirable limitation on the pulse frequency that can be derived from the storage means.

An object of this invention is to provide an improved pulse generating means.

A more specific object of this invention is to provide an improved pulse generating means in which the recharging time of the storage means is shortened.

The objects of this invention are attained by connecting a differentiating circuit to the discharge circuit of an energy storing means and employing the differentiated voltage spike to momentarily reduce the resistance between the direct current charging source and the energy storage means. Other objects and features of this invention will become apparent to those skilled in the art by referring to the specific embodiments described in the following specification and illustrated in the accompanying drawing in which.

Figure 1:
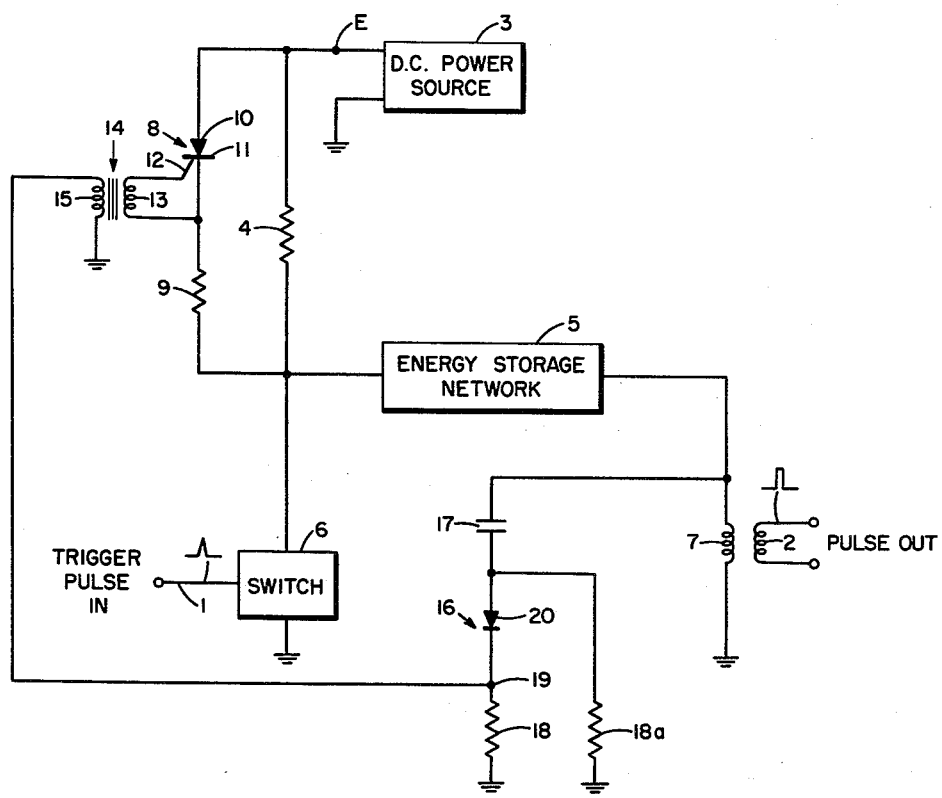
FIG. 1 is a block diagram illustrating the principles of this invention.

Trigger pulses are received at input terminal 1 and are employed in the system of FIG. 1 for initiating powerful pulses of carefully controlled amplitude and duration at the output load circuit 2. The trigger pulses may, for example, comprise minute interrogating or other signals which are employed for generating pulses of sufficient power for turning on a normally quiescent magnetron type microwave oscillator. Power for the system is derived from the D.C. power source 3 having terminal voltage E at its output terminal. The D.C. power is applied through the resistor 4 of predetermined and fairly high resistance to the energy storing means 5. The limitations on the value of resistance 4 will become apparent below. While the energy storing means 5 may comprise simple high capacity condensers, it has been found desirable to employ open-ended artificial transmission lines having considerable lumped shunt capacity and series inductance, one example of which is shown in detail in FIG. 2. Artificial transmission lines have the advantage over single capacitance storage devices in that it enables one to shape the pulse as desired. When fully charged, the storage condensers are maintained at the terminal voltage E of the D.C. power source 3. When a trigger signal is received at input terminal 1, the switch 6 closes and discharges the stored energy through the load consisting, in FIG. 1, of the primary winding 7 of the output transformer. Since resistor 4 and the capacitance of the storage means is large, it will now be perceived that the RC time constant of the circuit including the capacities C of the storage means 5 and the resistance R of resistor 4 is relatively high. For some applications where interrogating pulses may be quite closely spaced, this time constant may be too long to permit full recharging of the storage means between pulses.

According to an important and characteristic feature of this invention, the charging resistor 4 is shunted momentarily immediately after each pulse by a relatively low resistance path. This path, in FIG. 1, comprises rectifier 8 and resistor 9 connected in series and hence across resistor 4. Rectifier 8 is of a controllable type such as the now commercially available so-called Silicon Controlled Rectifier having anode electrode 10, cathode electrode 11 and control electrode 12. When the control electrode is supplied with a positive current pulse, the anode-to-cathode resistance drops from a high value of several megohms to a relatively low value, much in the manner of a thyratron. The trigger circuit for the rectifier 8 comprises the secondary winding 13 of transformer 14 connected between the cathode and control electrodes. The primary winding 15 is connected to the differentiating circuit 16 connected to respond to the primary output pulse delivered to the output circuit 2. The differentiating circuit comprises condenser 17 and load resistor 18 with the rectifier diode 20 connected so that a positive pulse is obtained at point 19. The polarity of the connections to the primary and secondary windings of transformer 14 are so chosen that control electrode 12 is driven sharply positive during the *decaying* or *descending* portion of the output primary pulse.

The switch 6 is of the type which will close to discharge the stored energy upon stimulus by the input trigger pulse and which will then open when the discharging current through the switch drops below a predetermined holding level, determined by the characteristics of the switch. Good results are obtained with switches of the four-layer diode type, the Shockley four-layer Silicon Diode 4J200 or 4AD50 being types in which the threshold holding current for maintaining conduction is of the order of 10 to 30 milliamperes. When the switch 6 is open, the charging process of storage means 5 can start again. Although the RC time constant of resistance 4 and capacity of storage means 5 may be several hundred microseconds, as soon as the switch 6 has opened, the differentiating circuit senses the pulse decay at output winding 7 and triggers rectifier 8 into conduction. The resistance of rectifier 8 drops nearly to zero, thus placing resistor 9 with its relatively low value in shunt across resistor 4 and suddenly decreases the mentioned time constant to some low value. The time required for charging storage means 5 to full voltage E may be reduced from, say, 400 microseconds to 2 or 3 microseconds. When the storage voltage approaches E, the drop across rectifier 8 drops to zero and the rectifier 8 is disabled. Resistance 4 then resumes its function of holding the charge in the storage network at voltage E. The system of FIG. 1 will thus respond to triggering pulses at input terminal 1 of high or low or random repetition rates. The highest repetition rate of the system of FIG. 1 is essentially limited only by the width of the output power pulse, and by the recovery time of the controlled rectifier which is a function of its physical properties.

Figure 2:
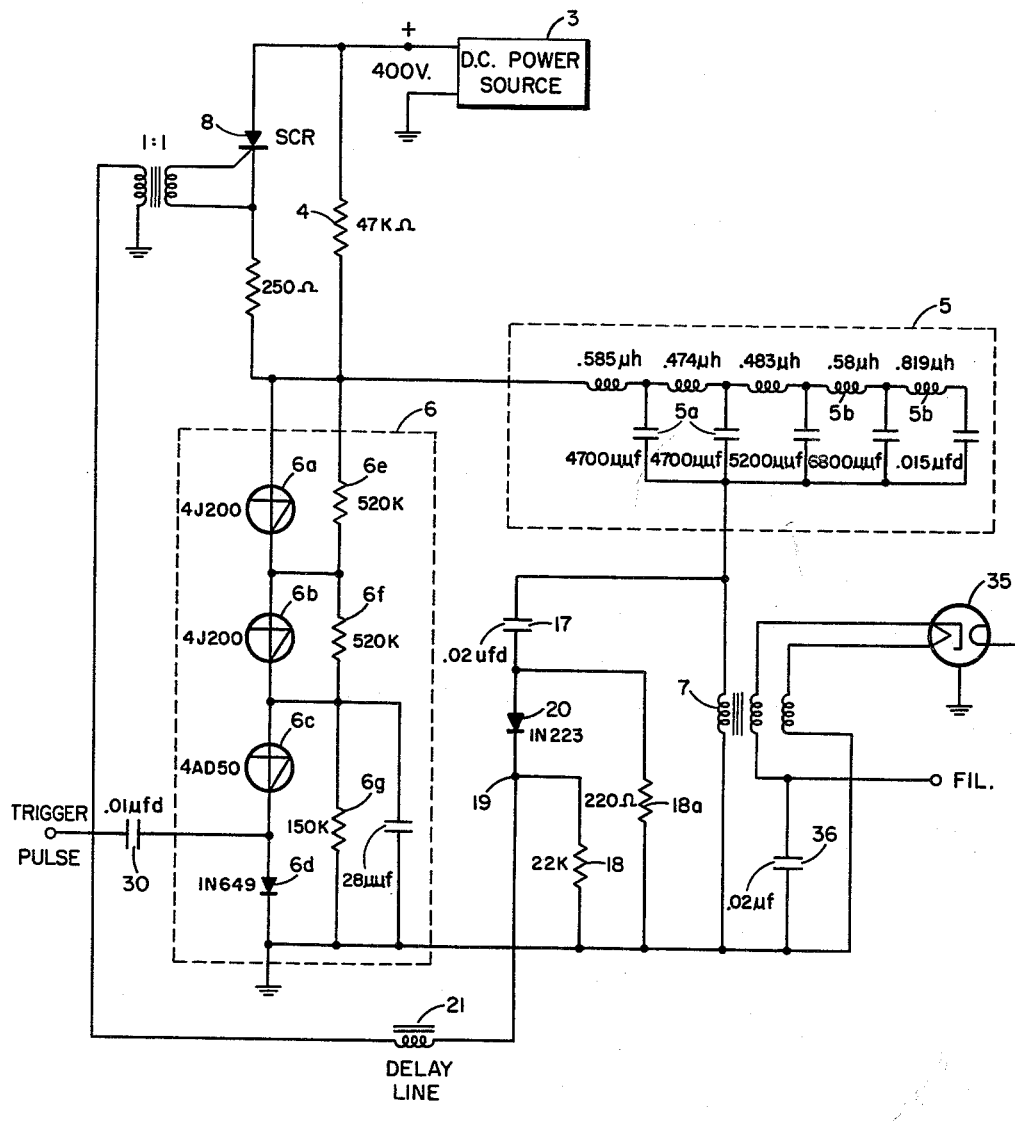
FIG. 2 is a circuit diagram of the system shown in FIG. 1.

FIG. 2 shows a complete schematic diagram of the circuit of FIG. 1, which performs satisfactorily. The switch 6 preferably comprises series connected four-layer silicon diodes of the type indicated, the number required depending upon the voltage E and the voltage rating of the diodes. The resistors 6e, 6f and 6g are connected in series across the diodes to equalize voltages across them. The storage voltage is of such a value and the relative values of the resistors are so chosen that the terminal voltages of the diodes are slightly below breakdown voltage. In series with the lower end of four-layer diode 6c is connected a conventional two-layer rectifier 6d across which is applied the input signal pulse, through coupling condenser 30. The series of diodes 6a, 6b, 6c and 6d remain nonconducting until the trigger pulse causes diode 6d to conduct, thereupon avalanche effects start in diodes 6c, 6d and 6a, to suddenly "dump" the energy content of the storage means into the load circuit. Rectifier 8 in one embodiment which successfully operated was of the General Electric type 4JC10D, having a nonconducting resistance of 1 to 2 megohms and a conducting resistance of but a few ohms.

The limitations on the value of resistor 4 in the circuit of FIG. 2 will now become apparent. Resistor 4 must have that value which will prevent more curent to flow than the solid state switch 6 requires as a holding current. In other words, resistor 4 should be at least equal to the voltage of the D.C. source E divided by the holding current of the switching device. With the four-layer diodes shown, resistor 4 was 47,000 ohms.

The differentiating circuit of the embodiment illustrated comprises a condenser 17 of .02 microfarad in series with rectifier 19 of the IN649 type and with resistor 18 of 22,000 ohms. Resistor 18a is 220 ohms. As stated, the primary pulse into the transformer is differentiated to produce at junction 19 a voltage spike marking the termination of the power pulse. The delay line 21 is preferably used in the practical feedback circuit to allow complete recovery of the solid state switch 6. The delay required in the embodiment considered here is about 2 microseconds.

Where a magnetron 35 is employed in the load circuit, the two secondary windings of transformer 7 are wound bifilar and are connected in the filament circuit of the magnetron. The transformer ratio may be in the 1:5 to 1:10 range. Direct curent filament power is applied across the filament windings, and the blocking condenser 36 is inserted to obviate a short circuit across the D.C. filament power source. The system constructed according to FIG. 2 operated well at a pulse repetition frequency of 5,000, at a duty ratio of .002. The minimum spacing of pulses was 10 microseconds for a maximum of five pulses in succession. The fast charging network including the differentiating circuit and the controlled shunting rectifier 8 makes it possible to attain these unusually high pulse rates and low duty ratio. The pulse wave shapes further were very good from the artificial line shown, the pulse rise time being .1 to .15 microsecond and pulse widths being .25 to .75 microsecond.

Many modifications may be made in the component parts of the system of FIGS. 1 or 2 by those skilled in the art without departing from the spirit of the invention as defined in the appended claims.

What is claimed is:

1. In combination in a pulse generating system, a capacity storage means, a current source for charging said storage means, a resistor of predetermined value in the charging circuit to establish a predetermined charging time constant, a first triggerable solid state switch means, a load circuit and said first switch means being serially connected with said storage means for delivering the energy in said storage means to said load circuit in a single power pulse when said first switch means is triggered, said resistor being connected to said first switch means for applying holding current thereto for maintaining said first switch means in open condition except when triggered, differentiating means connected to said load circuit and responsive to the decaying portion of said power pulse for producing a voltage spike to mark the termination of said power pulse, and a second switch means connected across said resistor in the charging circuit and responsive to said spike for momentarily reducing the resistance of the path between said source and said storage means until said storage means is substantially charged by said current source, and delay means in circuit between said differentiating means and said second switch means for permitting said first switch means to fully open before charging reoccurs.

2. In combination in a power pulse generating system, an artificial transmission line with series lumped inductances and shunt capacitances, a charging circuit connected across said line, means in said charging circuit for establishing, respectively, a relatively high and a relatively low charging circuit resistance switch means adapted to be switched from open to closed condition by a triggering pulse, a discharge circuit connected across said line and including said switch means and a load circuit connected in series with said line for delivering a power pulse to said load circut when said switch is closed, a holding circuit for said switch means including said charging circuit resistance for preventing said switch means from being triggered except by said triggering pulse, means connected in circuit relationship with said charging circuit and operative at the termination of said power pulse for reducing said charging circuit resistance from said relatively high to said relatively low resistance value for a period of time until said line is charged to accelerate the charging rate of said line after each discharge, and delay means in circuit with said charging circuit for permitting said switch means to fully open before charging reoccurs.

3. In a power pulse generating system, the combination comprising
   (a) storage capacity means,
   (b) a charging circuit connected across said capacity means and including a resistance,
   (c) triggerable switch means connected in said charging circuit effectively across said resistance and responsive to the voltage across said resistance, said switch means having a closed condition when triggered and when said voltage is greater than a predetermined magnitude, said switch means having an open condition when untriggered and when said voltage is less than said predetermined magnitude,
   (d) a load circuit,
   (e) a solid state switch responsive to a triggering pulse and connected in series with said load circuit and said storage capacitor means for delivering the energy of said capacity means to said load circuit in a single power pulse when said switch is triggered, said resistance being connected to said solid state switch for applying holding bias thereto,
   (f) means responsive to the termination of said pulse for triggering said triggerable switch means, and
   (g) delay means, said delay means being connected to said triggerable switch means in said charging circuit and responsive to said power pulse for operating said triggerable switch means a predetermined interval of time after said power pulse to permit recovery of the mentioned load circuit switch before charging reoccurs.

4. In a power pulse generating system, the combination comprising
   (a) storage capacity means,
   (b) a charging circuit connected across said capacity means and including a resistance,
   (c) triggerable switch means connected in said charging circuit effectively across said resistance and responsive to the voltage across said resistance, said switch means having a closed condition when triggered and when said voltage is greater than a predetermined magnitude, said switch means having an open condition when said voltage is less than said predetermined magnitude,
   (d) a load circuit,
   (e) a solid state switch responsive to a triggering pulse and connected in series with said load circuit and said storage capacitor means for delivering the energy of said capacity means to said load circuit in a single power pulse when said switch is triggered, said resistance being connected to said solid state switch for applying holding bias thereto, and (f) means responsive to the termination of said pulse for triggering said triggerable switch means.

References Cited in the file of this patent
UNITED STATES PATENTS

| | | |
|---|---|---|
| 2,211,404 | Braden | Aug. 13, 1940 |
| 2,791,688 | Cutler et al. | May 7, 1957 |
| 2,855,524 | Shockley | Oct. 7, 1958 |
| 2,916,640 | Pearson | Dec. 8, 1959 |
| 2,947,884 | Horodyski | Aug. 2, 1960 |